US012703373B2

(12) United States Patent
Shiomi

(10) Patent No.: US 12,703,373 B2
(45) Date of Patent: Aug. 11, 2026

(54) ARITHMETIC PROCESSING DEVICE AND ARITHMETIC PROCESSING METHOD

(71) Applicant: Hitachi Astemo, Ltd., Hitachinaka (JP)

(72) Inventor: Keishi Shiomi, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 65 days.

(21) Appl. No.: 18/836,309

(22) PCT Filed: Mar. 29, 2022

(86) PCT No.: PCT/JP2022/015426
§ 371 (c)(1),
(2) Date: Aug. 6, 2024

(87) PCT Pub. No.: WO2023/187979
PCT Pub. Date: Oct. 5, 2023

(65) Prior Publication Data

US 2025/0115259 A1 Apr. 10, 2025

(51) Int. Cl.
*B60W 50/023* (2012.01)
*B60W 60/00* (2020.01)
(Continued)

(52) U.S. Cl.
CPC .......... *B60W 50/023* (2013.01); *B60W 60/00* (2020.02); *G06V 10/147* (2022.01); (Continued)

(58) Field of Classification Search
CPC ................. G06V 10/147; G06V 20/56; B60W 2420/403; B60W 2552/05;
(Continued)

(56) References Cited

U.S. PATENT DOCUMENTS 9,053,562 B1 * 6/2015 Rabin ........................ H04S 7/30
10,732,628 B2 * 8/2020 Sakaguchi ............ G01S 15/931
(Continued)

FOREIGN PATENT DOCUMENTS

CN 107031600 A * 8/2017 .......... B60W 50/085
CN 208094710 U * 11/2018
(Continued)

OTHER PUBLICATIONS

International Search Report Issued in PCT Application No. PCT/JP2022/015426 dated Jun. 21, 2022, with English Translation.

*Primary Examiner* — Babar Sarwar
(74) *Attorney, Agent, or Firm* — Foley & Lardner LLP

(57) ABSTRACT

Provided is an arithmetic processing device capable of switching a setting of an image processing unit according to a situation while suppressing an increase in cost and power consumption. An arithmetic processing device connected to a plurality of sensing devices mounted on a vehicle includes: a microcomputer which performs an arithmetic operation to control the plurality of sensing devices; and a memory in which a first arithmetic processing program and a second arithmetic processing program are stored, wherein the first arithmetic processing program does not adopt redundancy for a failure of the sensing devices and the microcomputer, the second arithmetic processing program adopts redundancy for a failure of the sensing devices or the microcomputer, and the microcomputer includes a program switching unit which switches an arithmetic processing program to be executed on the microcomputer, among the first arithmetic processing program and the second arithmetic processing program, according to a travel environment or a control state of the vehicle.

10 Claims, 10 Drawing Sheets

(51) Int. Cl.
*G06V 10/147* (2022.01)
*G06V 20/56* (2022.01)
*H04N 13/239* (2018.01)

(52) U.S. Cl.
CPC ....... *G06V 20/56* (2022.01); *B60W 2420/403* (2013.01); *B60W 2552/05* (2020.02); *B60W 2556/40* (2020.02); *H04N 13/239* (2018.05)

(58) Field of Classification Search
CPC ........... B60W 2556/40; B60W 50/023; B60W 60/00; H04N 13/239
See application file for complete search history.

(56) References Cited

U.S. PATENT DOCUMENTS

| | | | | |
|---|---|---|---|---|
| 11,682,244 | B1 * | 6/2023 | Konrardy | G05D 1/692 701/29.7 |
| 12,304,508 | B2 * | 5/2025 | Maeda | B62D 5/04 |
| 12,367,681 | B2 * | 7/2025 | Yang | G06T 5/80 |
| 2011/0082642 | A1 * | 4/2011 | Magnussen | G01C 21/30 701/532 |
| 2015/0344032 | A1 * | 12/2015 | Oh | B60W 30/16 348/46 |
| 2016/0301923 | A1 * | 10/2016 | Ichige | H04N 13/239 |
| 2017/0151950 | A1 * | 6/2017 | Lien | B60W 60/0051 |
| 2017/0154225 | A1 * | 6/2017 | Stein | B60W 60/00274 |
| 2018/0088577 | A1 * | 3/2018 | Kim | B60W 30/00 |
| 2019/0031161 | A1 * | 1/2019 | Ji | B60T 8/171 |
| 2019/0047588 | A1 * | 2/2019 | Yabuuchi | B60W 50/14 |
| 2019/0315344 | A1 * | 10/2019 | Guibert De Bruet | B60W 30/09 |
| 2019/0369635 | A1 * | 12/2019 | Kobayashi | B60W 60/0059 |
| 2020/0079394 | A1 * | 3/2020 | Masuda | B60R 21/00 |
| 2020/0104604 | A1 * | 4/2020 | Yoshikawa | G06V 20/56 |
| 2020/0317213 | A1 * | 10/2020 | Oba | B60K 35/29 |
| 2021/0004622 | A1 * | 1/2021 | We | G06V 20/588 |
| 2021/0294574 | A1 * | 9/2021 | Fan | G06F 5/01 |
| 2021/0300348 | A1 * | 9/2021 | Yasui | G06N 3/092 |
| 2021/0347371 | A1 * | 11/2021 | Lee | B60W 60/0053 |
| 2021/0366141 | A1 * | 11/2021 | Takahashi | G06T 7/529 |
| 2021/0397854 | A1 * | 12/2021 | Brizzi | G06T 7/248 |
| 2022/0126872 | A1 * | 4/2022 | Han | B60W 60/0018 |
| 2022/0169279 | A1 * | 6/2022 | Griffin | B60W 60/001 |
| 2022/0185115 | A1 * | 6/2022 | Divekar | B60W 50/023 |
| 2022/0189059 | A1 * | 6/2022 | Sui | G06T 7/70 |
| 2022/0303521 | A1 * | 9/2022 | Noguchi | G01S 7/497 |
| 2023/0033322 | A1 * | 2/2023 | Belling-Hoffmann | B62D 5/0487 |
| 2023/0147535 | A1 * | 5/2023 | Terazawa | G01C 21/30 |
| 2023/0303116 | A1 * | 9/2023 | Mizoguchi | G06V 20/56 |
| 2023/0415778 | A1 * | 12/2023 | Mori | B60W 50/0205 |
| 2024/0029450 | A1 * | 1/2024 | Kawanai | B60W 60/0051 |
| 2024/0046502 | A1 * | 2/2024 | Sakano | G01C 21/30 |
| 2024/0103525 | A1 * | 3/2024 | Lee | G06T 7/60 |
| 2024/0160433 | A1 * | 5/2024 | Nomura | G06F 21/602 |
| 2024/0169587 | A1 * | 5/2024 | Han | G06T 7/70 |
| 2024/0265707 | A1 * | 8/2024 | Peppoloni | G06T 7/97 |
| 2024/0274009 | A1 * | 8/2024 | Horita | G01S 13/931 |
| 2025/0026383 | A1 * | 1/2025 | Manawadu | B60W 40/08 |

FOREIGN PATENT DOCUMENTS

| | | | | | |
|---|---|---|---|---|---|
| CN | 109863513 | A | * | 6/2019 | G01C 21/3407 |
| CN | 115320603 | A | * | 11/2022 | B60W 40/00 |
| CN | 115578701 | A | * | 1/2023 | G06T 7/73 |
| CN | 115769050 | A | * | 3/2023 | G06V 20/588 |
| CN | 116534038 | A | * | 8/2023 | B60W 50/029 |
| CN | 116853275 | A | * | 10/2023 | B60W 50/023 |
| EP | 2116958 | A2 | * | 11/2009 | G06V 20/588 |
| EP | 3888992 | A1 | * | 10/2021 | B60W 50/16 |
| EP | 4613598 | A1 | * | 9/2025 | B60W 30/14 |
| JP | 3539362 | B2 | * | 7/2004 | B62D 1/28 |
| JP | 2013114606 | A | * | 6/2013 | G08G 1/166 |
| JP | 2016037098 | A | * | 3/2016 | G07C 5/0891 |
| JP | 2020047059 | A | * | 3/2020 | |
| JP | 2020051942 | A | * | 4/2020 | G06T 3/40 |
| JP | 2020073362 | A | * | 5/2020 | H04N 9/3179 |
| JP | 2020152233 | A | * | 9/2020 | B60R 16/0232 |
| JP | 7702037 | B2 | * | 7/2025 | G06V 20/56 |
| KR | 101723948 | B1 | * | 4/2017 | H04N 23/60 |
| KR | 20180056322 | A | * | 5/2018 | B60W 30/12 |
| KR | 20240043194 | A | * | 4/2024 | B60W 50/02 |
| KR | 20240080218 | A | * | 6/2024 | G06F 9/06 |
| WO | WO-2018003304 | A1 | * | 1/2018 | B60W 40/06 |
| WO | WO-2018070064 | A1 | * | 4/2018 | B60W 50/02 |
| WO | WO-2018101603 | A1 | * | 6/2018 | H04N 13/204 |
| WO | WO-2024095736 | A1 | * | 5/2024 | B61L 15/0062 |
| WO | WO-2024120823 | A1 | * | 6/2024 | G06V 10/147 |
| WO | WO-2024188875 | A1 | * | 9/2024 | B60W 50/14 |
| WO | WO-2025159225 | A1 | * | 7/2025 | G06F 11/30 |

* cited by examiner

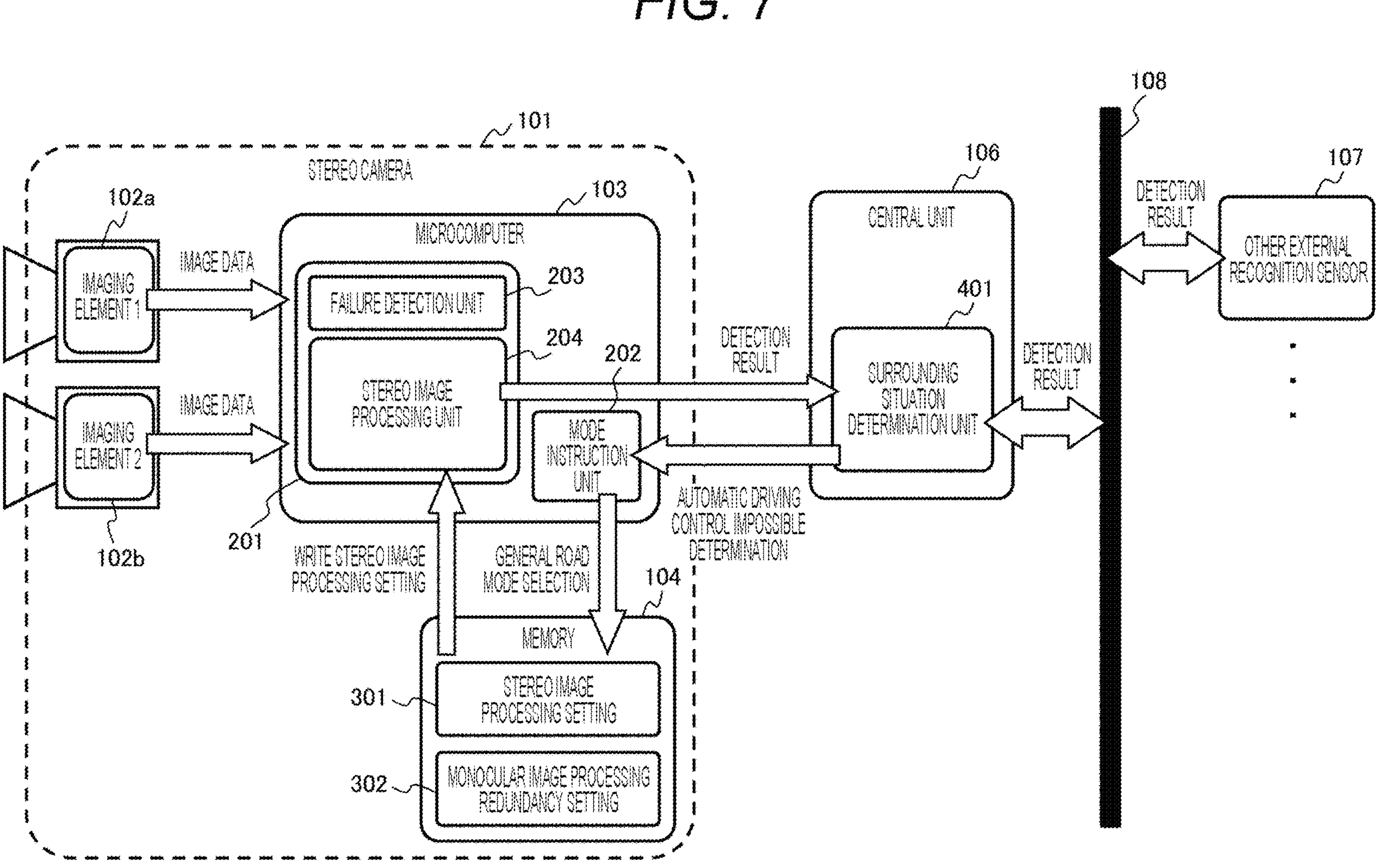
FIG. 7
101
STEREO CAMERA
102a
IMAGING ELEMENT 1
IMAGING ELEMENT 2
102b
IMAGE DATA
IMAGE DATA
103
MICROCOMPUTER
203
FAILURE DETECTION UNIT
204
STEREO IMAGE PROCESSING UNIT
202
MODE INSTRUCTION UNIT
201
WRITE STEREO IMAGE PROCESSING SETTING
GENERAL ROAD MODE SELECTION
104
MEMORY
301
STEREO IMAGE PROCESSING SETTING
302
MONOCULAR IMAGE PROCESSING REDUNDANCY SETTING
DETECTION RESULT
AUTOMATIC DRIVING CONTROL IMPOSSIBLE DETERMINATION
106
CENTRAL UNIT
401
SURROUNDING SITUATION DETERMINATION UNIT
DETECTION RESULT
108
DETECTION RESULT
107
OTHER EXTERNAL RECOGNITION SENSOR

ARITHMETIC PROCESSING DEVICE AND ARITHMETIC PROCESSING METHOD

TECHNICAL FIELD

The present invention relates to a configuration of an arithmetic processing device that performs arithmetic processing for controlling an on-vehicle device and control of the arithmetic processing device, and particularly relates to an effective technology applied to an arithmetic processing device of a stereo camera.

BACKGROUND ART

A driving support function for controlling a vehicle based on a sensing result of an on-vehicle external recognition device (on-vehicle camera) has been developed, and partial automated control of an accelerator/brake operation and a steering wheel operation, such as emergency brake control for a front obstacle and a preceding vehicle following function, has been put into practical use. In addition, development of automatic driving control in which the system performs all driving operations and does not assume performing driving operations and monitoring of a travel environment by a driver is also in progress.

In a case of assuming performing driving operations and monitoring a travel environment by a driver, fail-safe is performed to stop the system and notify the driver of the failure at the time of failure. However, in a case of not assuming performing driving operations and monitoring a travel environment by a driver, it is necessary to perform a fail operation to safely perform control even at the time of failure.

As an example of an on-vehicle external recognition device that performs front sensing by a camera, there is a method which adopts redundancy by mounting two imaging units and two image processing units of the camera, and in a case where one of the imaging units or the image processing units fails, the external environment is recognized by the other normal imaging unit and image processing unit to continue vehicle control, and safety is secured even at the time of failure. In such a redundancy method, there is a problem that the cost increases and the power consumption increases due to the increase in hardware although the functions are the same at the time of normal operation.

In order to improve such a problem, for example, as described in PTL 1, there is an example in which two imaging units, both a stereo image processing unit and a monocular image processing unit are provided, stereo image processing is performed by images from the two imaging units at the time of normal operation, and switching to monocular image processing is performed in a case where the stereo image processing cannot be performed due to a failure. According to this method, it is possible to improve the external recognition performance by achieving a fail operation and performing stereo image processing at the time of normal operation.

CITATION LIST

Patent Literature

PTL 1: JP 2020-47059 A

SUMMARY OF INVENTION

Technical Problem

By the way, when a vehicle travels on a general road, an inter-vehicle distance from other vehicles traveling around the vehicle is relatively short, and there are many cases where an obstacle such as a bicycle traveling on a road shoulder or a parked or stopped vehicle exists. Therefore, high external recognition performance by stereo image processing is required, and when a failure occurs in the on-vehicle external recognition device, it is necessary to stop the function of the on-vehicle external recognition device and perform fail-safe to notify the driver of the failure.

On the other hand, when a vehicle travels on a highway, there are many cases where an inter-vehicle distance from other vehicles is relatively long, and there are few surrounding obstacles. Therefore, there is a demand for a fail operation in which a function of a failed part of the on-vehicle external recognition device is stopped, and partial automatic driving control or driving support is continued by utilizing a function of a normal part.

In order to achieve both of these conditions, the configuration including two imaging units, both a stereo image processing unit and a monocular image processing unit as in PTL 1, or a redundant configuration in which two imaging units and two monocular image processing units are mounted can be considered.

However, in the technique of PTL 1, since the stereo image processing and the monocular image processing are operated in parallel, a high-performance microcomputer is required, and power consumption also increases.

In addition, in the redundant configuration in which two imaging units and two monocular image processing units are mounted, the cost and the power consumption increase although the functions at the time of normal operation are the same as described above.

Therefore, an object of the present invention is to provide an arithmetic processing device and an arithmetic processing method capable of switching a setting of an image processing unit according to a situation while suppressing an increase in cost and power consumption.

Solution to Problem

In order to solve the above problems, according to the present invention, an arithmetic processing device connected to a plurality of sensing devices mounted on a vehicle including: a microcomputer which performs an arithmetic operation to control the plurality of sensing devices; and a memory in which a first arithmetic processing program and a second arithmetic processing program are stored, wherein the first arithmetic processing program does not adopt redundancy for a failure of the sensing devices and the microcomputer, the second arithmetic processing program adopts redundancy for a failure of the sensing devices or the microcomputer, and the microcomputer includes a program switching unit which switches an arithmetic processing program to be executed on the microcomputer, among the first arithmetic processing program and the second arithmetic processing program, according to a travel environment or a control state of the vehicle.

Furthermore, according to the present invention, an arithmetic processing method for controlling a plurality of sensing devices mounted on a vehicle: includes: (a) determining whether the vehicle is traveling on a general road or a highway based on a travel environment or a control state of the vehicle; (b) selecting one of a first arithmetic processing program which does not adopt redundancy for a failure of the sensing devices and a microcomputer or a second arithmetic processing program which adopts redundancy for a failure of the sensing devices or the microcomputer according to a determination result in the step (a); and (c) rewriting an arithmetic processing program to be executed on the microcomputer based on the arithmetic processing program selected in the step (b).

Advantageous Effects of Invention

According to the present invention, it is possible to realize an arithmetic processing device and an arithmetic processing method capable of switching a setting of an image processing unit according to a situation while suppressing an increase in cost and power consumption.

The problems, configurations, and effects other than those described above will be clarified by the following description of embodiments.

BRIEF DESCRIPTION OF DRAWINGS

FIG. 7 is a diagram conceptually illustrating an operation of the on-vehicle external recognition device of FIG. 6 at the time of determining that automatic driving control is impossible.

DESCRIPTION OF EMBODIMENTS

Figure 1:
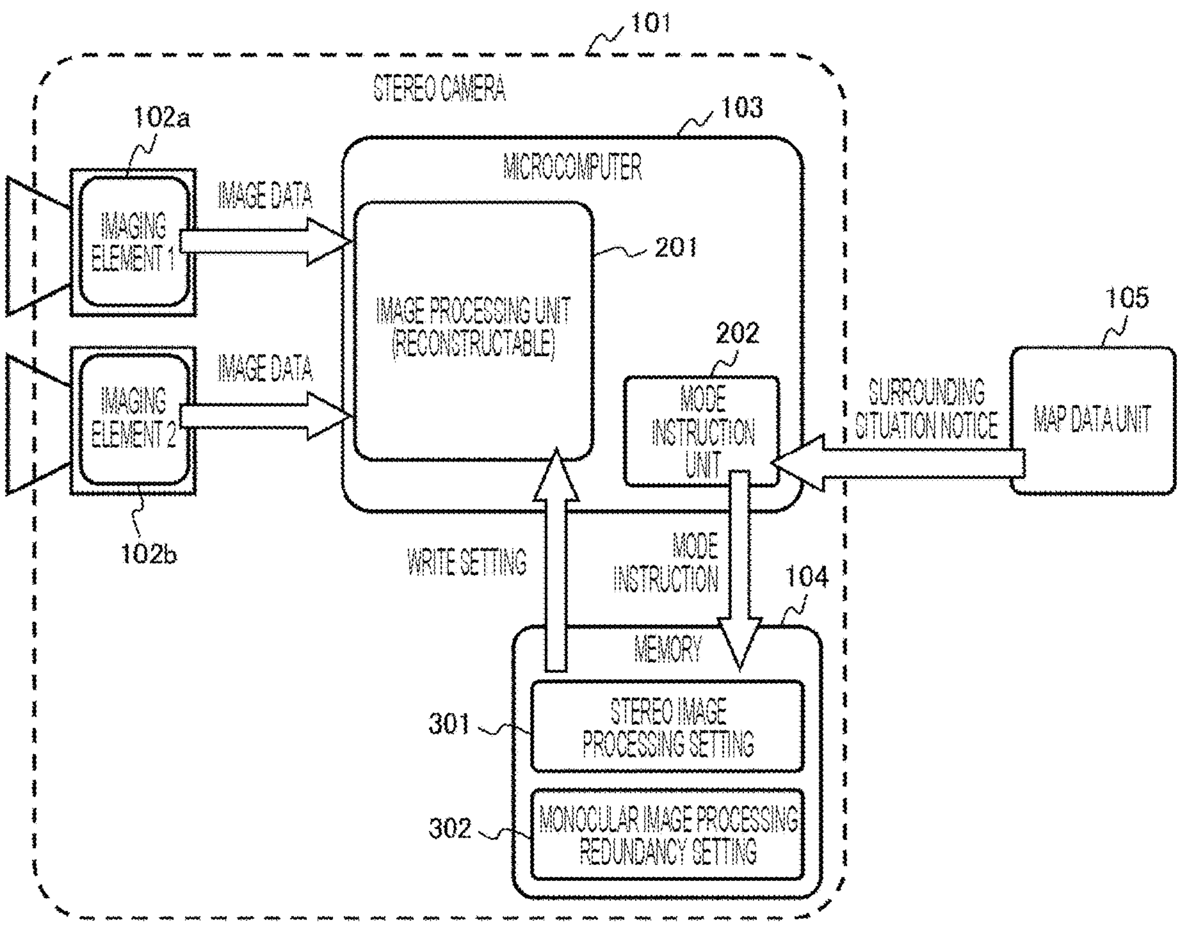
FIG. 1 is a diagram illustrating a schematic configuration of an on-vehicle external recognition device according to a first embodiment of the present invention.

Hereinafter, embodiments of the present invention will be described with reference to the drawings. In the drawings, the same components are denoted by the same reference numerals, and the detailed description of overlapping components is omitted.

In each of the following embodiments, an arithmetic processing device that performs arithmetic processing for controlling an on-vehicle device will be described by taking an on-vehicle external recognition device (on-vehicle camera) as an example.

First Embodiment

An on-vehicle external recognition device according to a first embodiment of the present invention will be described with reference to FIGS. 1 to 5. FIG. 1 is a diagram illustrating a schematic configuration of an on-vehicle external recognition device of the present embodiment.

As illustrated in FIG. 1, the on-vehicle external recognition device of the present embodiment includes a stereo camera 101 and a map data unit 105 as main components. The stereo camera 101 and the map data unit 105 are connected by an on-vehicle network such as a controller area network (CAN) or an over the air (OTA), and the surrounding situation is notified from the map data unit 105 to the stereo camera 101.

The stereo camera 101 includes imaging elements 102*a* and 102*b* which recognize the external environment and obtain image data, an image processing microcomputer 103 which performs an arithmetic operation based on the image data and obtains information necessary for vehicle control, and a memory 104 which stores an image processing setting of the image processing microcomputer 103.

The map data unit 105 transmits information on the travel environment including the surrounding situation to the stereo camera 101.

The image processing microcomputer 103 includes an image processing unit 201 which has arithmetic logic for image processing and can reconstruct the logic by dynamic reconfiguration, and a mode instruction unit 202 which receives information of the map data unit 105 and determines the setting of the image processing unit 201.

Note that the "configuration" means a setting item and an environment setting that can be specified and changed by a user with respect to the operation, configuration, and the like of the device and software. In addition, in the description, "dynamic reconfiguration" means processing in which a microcomputer which performs image processing partially rewrites arithmetic logic while starting a system.

The memory 104 includes a stereo image processing setting 301 and a monocular image processing redundancy setting 302 to be written in the image processing unit 201.

In the present embodiment, switching processing and processing at the time of failure detection of the image processing unit 201 based on the surrounding situation acquired from the map data unit 105 will be described.

In the vehicle control of the present embodiment, partial automated control such as emergency brake control, a preceding vehicle following function, and lane keep assist is performed relative to a front obstacle on a general road. On a highway or in some conditions on a highway, in addition to the partial automated control described above, control in which all driving operations are automated is performed, which does not require performing driving operations and monitoring a travel environment by a driver. While performing control in which all driving operations are automated, the driver is permitted to perform operations other than driving operations, such as navigation operations.

All of them are to perform a part or all of the control of the vehicle based on an output from a sensing device which recognizes the external environment such as a camera or a radar mounted on the vehicle. As described above, there are various levels of automated control of the vehicle from partial automated control (also referred to as driving assistance) to complete automated control.

It is assumed that the vehicle in the present invention is controlled in a predetermined automated control mode (including driving assistance) at least at one or more levels in addition to a complete manual driving (i.e., non-automated control) mode.

In the present invention, not only the automatic driving level determined by the country or the industry association but also these levels are collectively referred to as "predetermined level" automated control.

The automated control mode may be automatically set to ON or OFF according to the external environment, or may be selectively set by the driver. In addition, in a case where a plurality of levels of the automated control mode can be selected in the vehicle, setting of the levels can be similarly set according to an external environment or selection of a driver.

Figure 2:
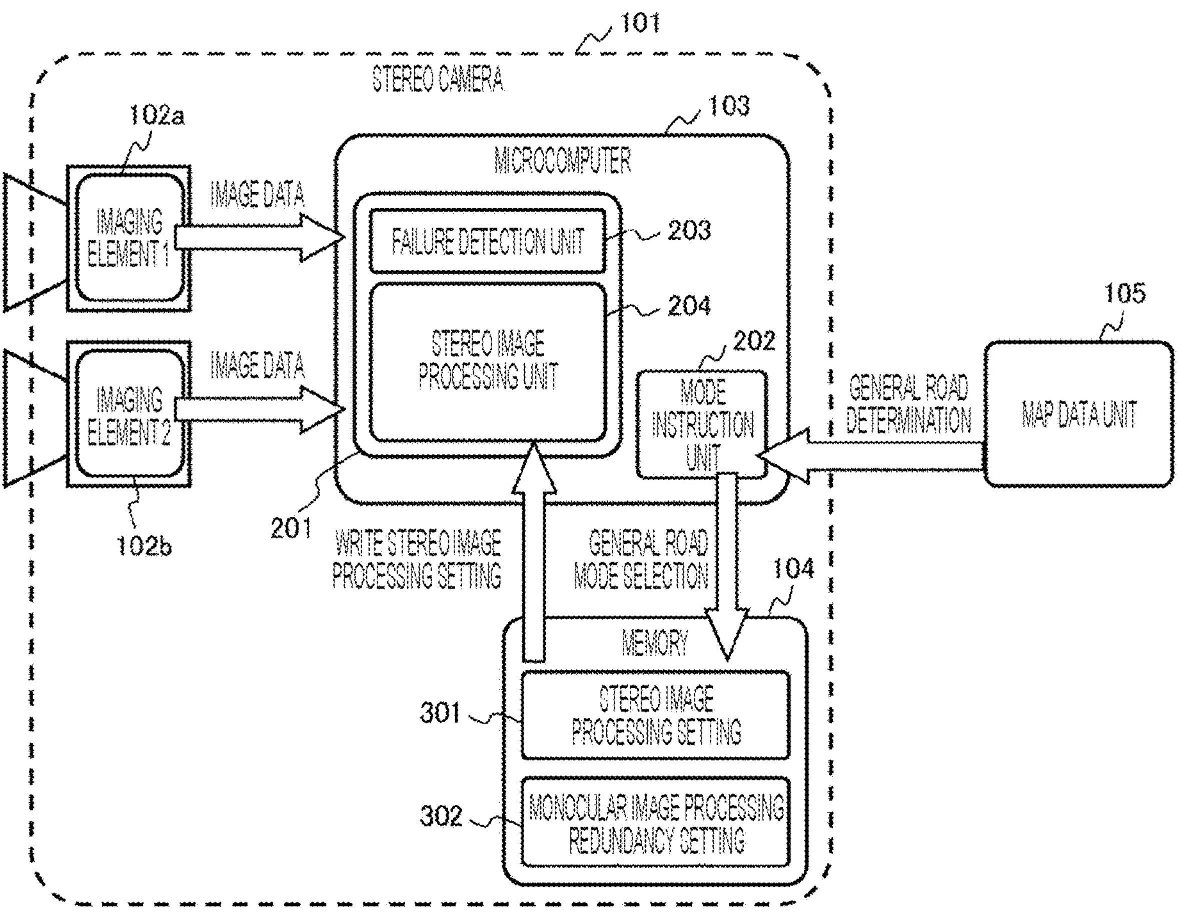
FIG. 2 is a diagram conceptually illustrating an operation of the on-vehicle external recognition device of FIG. 1 on a general road.

The operation of the on-vehicle external recognition device of the present embodiment on the general road will be described with reference to FIG. 2. FIG. 2 is a diagram conceptually illustrating an operation of the on-vehicle external recognition device of FIG. 1 on the general road.

As illustrated in FIG. 2, in a case where the mode instruction unit 202 receives information on the general road from the map data unit 105, the stereo image processing setting 301 is read from the memory 104, and the image processing unit 201 is rewritten.

The image processing unit 201 rewritten to the stereo image processing setting 301 includes a stereo image processing unit 204 and a stereo image processing failure detection unit 203 capable of detecting a failure in any of the imaging elements 102*a* and 102*b* and the stereo image processing unit 204.

In a case where the stereo image processing setting 301 is written to the image processing unit 201, only partial automated control can be used, and control in which all driving operations are automated cannot be used.

In a case where the stereo image processing failure detection unit 203 detects a failure, the system of the stereo camera 101 is stopped and a fail-safe operation of notifying the vehicle of the failure is performed. Since not all driving operations are controlled automatically, safety can be ensured by the fail-safe operation.

Figure 3:
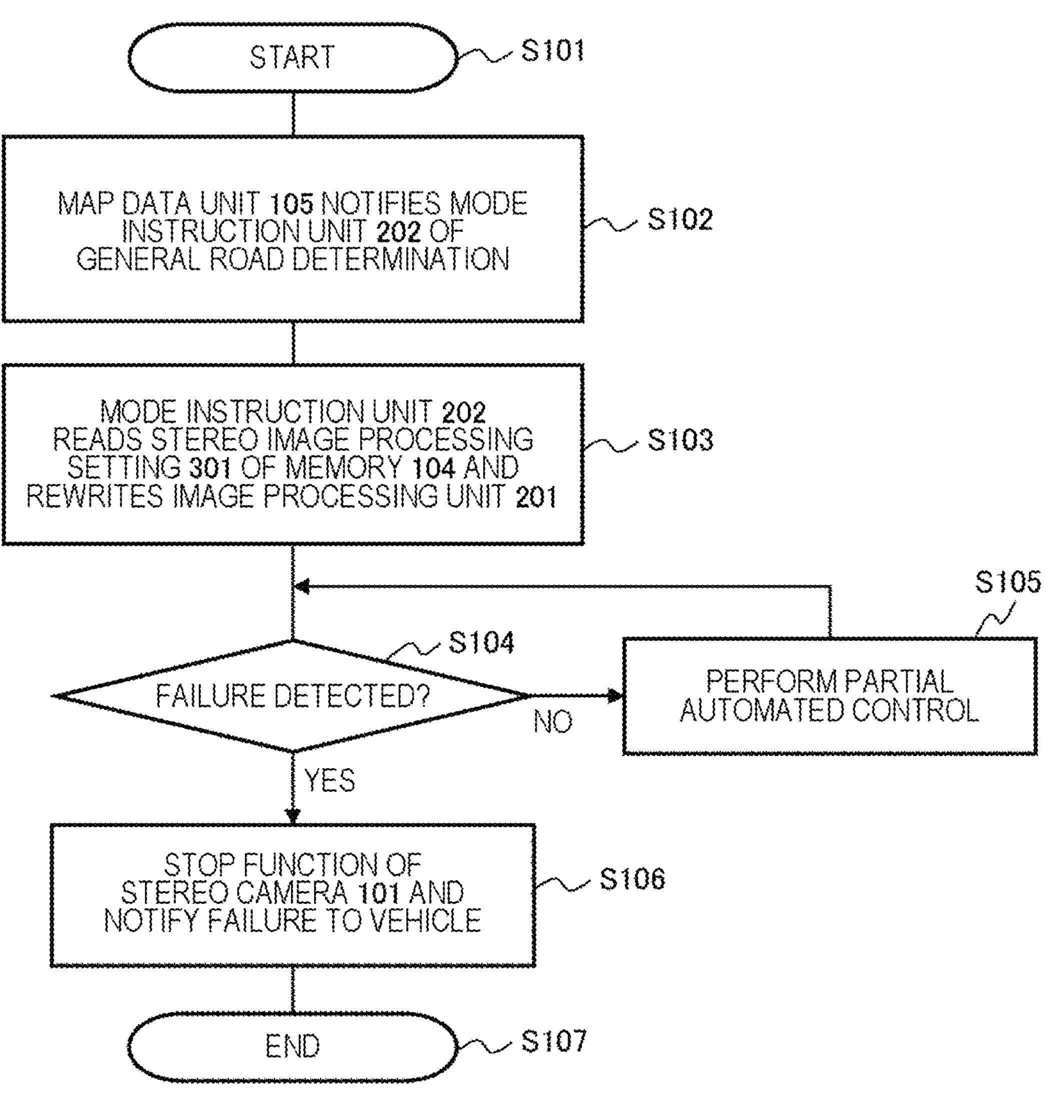
FIG. 3 is a flowchart illustrating an operation of the on-vehicle external recognition device of FIG. 1 on a general road.

The above operation will be described with reference to FIG. 3. FIG. 3 is a flowchart illustrating an operation of the on-vehicle external recognition device of FIG. 1 on a general road.

When the operation the on-vehicle external recognition device starts in step S101, first, in step S102, the map data unit 105 notifies the mode instruction unit 202 of the general road determination.

Next, in step S103, the mode instruction unit 202 reads the stereo image processing setting 301 of the memory 104 and rewrites the image processing unit 201.

Subsequently, in step S104, it is determined whether there is a failure in the imaging elements 102*a* and 102*b* and the stereo image processing unit 204.

In a case where a failure of any one of the imaging elements 102*a* and 102*b* and the stereo image processing unit 204 is detected, the process proceeds to step S106, the function of the stereo camera 101 is stopped, the failure is notified to the vehicle, and the process ends (step S107).

On the other hand, in a case where it is determined that none of the imaging elements 102*a* and 102*b* and the stereo image processing unit 204 fails, the process proceeds to step S105, partial automated control is performed, the process returns to step S104, and the processes after step S104 are repeated.

Figure 4:
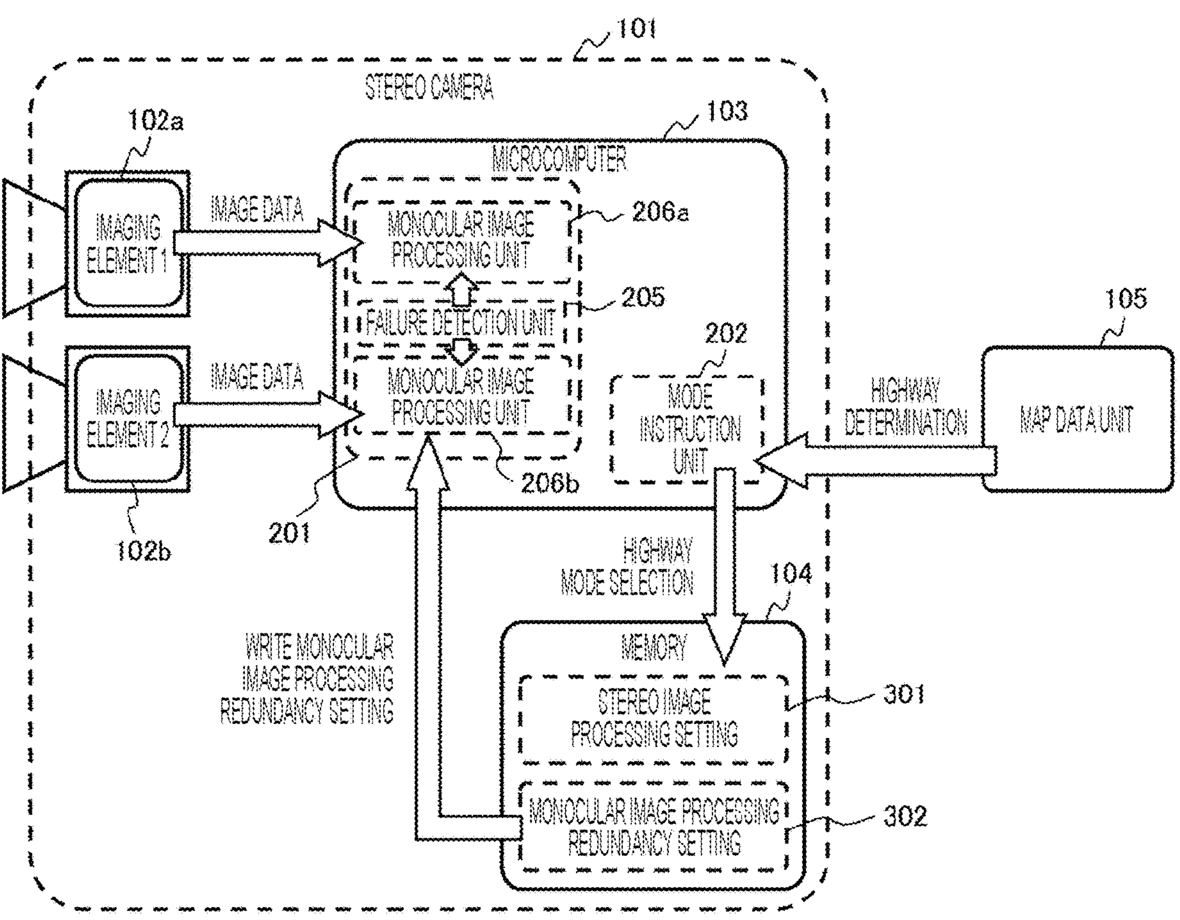
FIG. 4 is a diagram conceptually illustrating an operation of the on-vehicle external recognition device of FIG. 1 on a highway.

The operation of the on-vehicle external recognition device of the present embodiment on a highway will be described with reference to FIG. 4. FIG. 4 is a diagram conceptually illustrating an operation of the on-vehicle external recognition device of FIG. 1 on a highway.

As illustrated in FIG. 4, in a case where the mode instruction unit 202 receives information of the highway from the map data unit 105, the monocular image processing redundancy setting 302 is read from the memory 104, and the image processing unit 201 is rewritten.

The image processing unit 201 rewritten to the monocular image processing redundancy setting 302 includes the monocular image processing units 206*a* and 206*b* and a monocular image processing failure detection unit 205 capable of detecting a failure in any one of the imaging elements 102*a* and 102*b* and the monocular image processing units 206*a* and 206*b*.

In a case where the monocular r image processing redundancy setting 302 is written to the image processing unit 201, control in which all driving operations are automated can be used.

The failure operation can be achieved by continuing the vehicle control based on the result of the monocular image processing 206*b* which indicates the normal operation in a case where the monocular image processing failure detection unit 205 detects a failure in the imaging element 102*a* or the monocular image processing unit 206*a*, and by continuing the vehicle control based on the result of the monocular image processing 206*a* which indicates the normal operation in a case where the monocular image processing failure detection unit 205 detects a failure in the imaging element 102*b* or the monocular image processing unit 206*b*.

Figure 5:
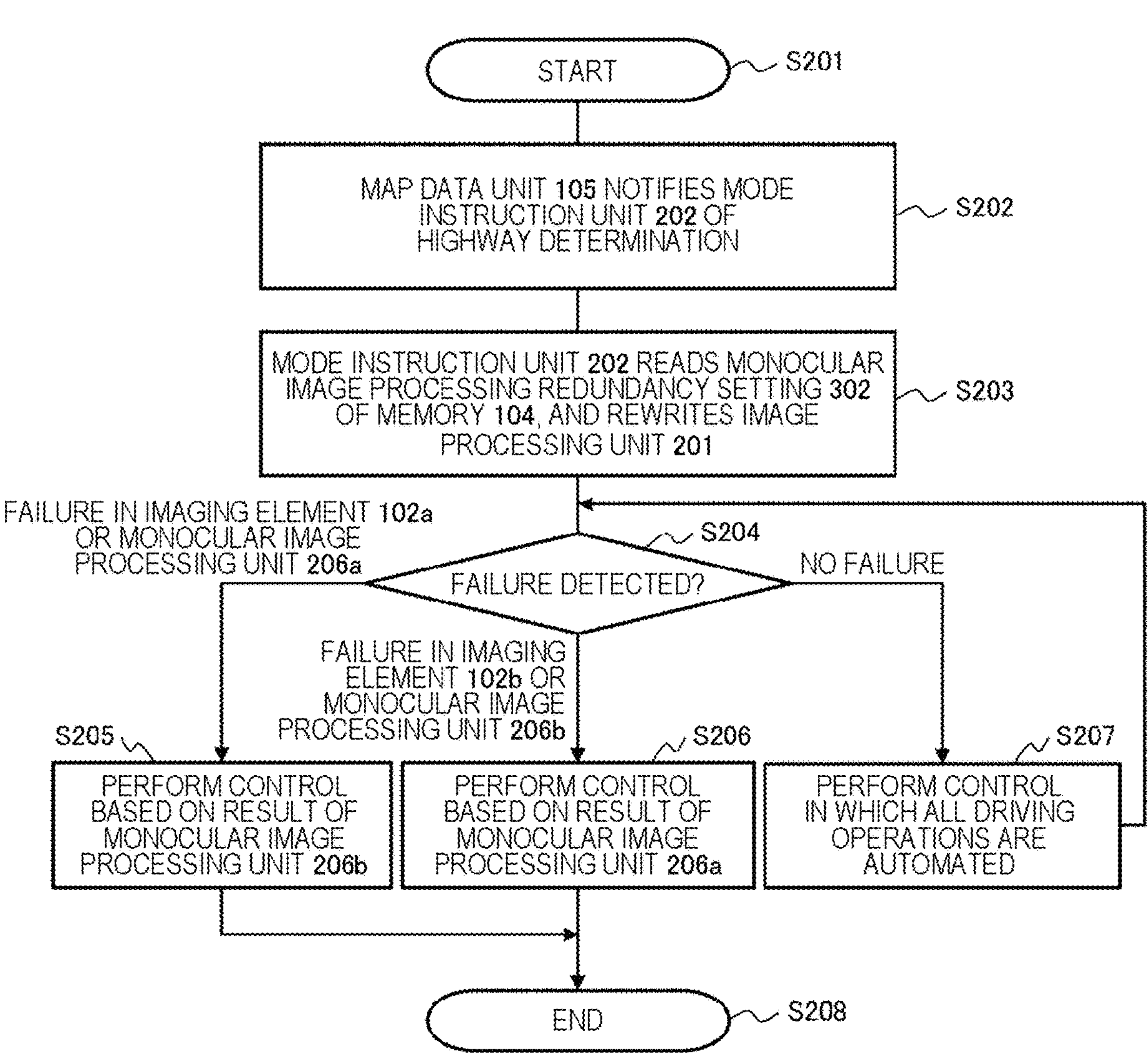
FIG. 5 is a flowchart illustrating an operation of the on-vehicle external recognition device of FIG. 1 on a highway.

The above operation will be described with reference to FIG. 5. FIG. 5 is a flowchart illustrating an operation of the on-vehicle external recognition device of FIG. 1 on a highway.

When the operation of the on-vehicle external recognition device starts in step S201, first, in step S202, the map data unit 105 notifies the mode instruction unit 202 of the highway determination.

Next, in step S203, the mode instruction unit 202 reads the monocular image processing redundancy setting 302 in the memory 104, and rewrites the image processing unit 201.

Subsequently, in step S204, it is determined whether there is a failure in the imaging elements 102*a* and 102*b* and the monocular image processing units 206*a* and 206*b*.

In a case where a failure of either the imaging element 102*a* or the monocular image processing unit 206*a* is detected, the process proceeds to step S205, control is performed based on the result of the monocular image processing unit 206*b*, and the process ends (step S208).

Furthermore, in a case where a failure of either the imaging element 102*b* or the monocular image processing unit 206*b* is detected, the process proceeds to step S206, control is performed based on the result of the monocular image processing unit 206*a*, and the process ends (step S208).

On the other hand, in a case where it is determined that none of the imaging elements 102*a* and 102*b* and the monocular image processing units 206*a* and 206*b* fails, the process proceeds to step S207 to perform control in which all driving operations are automated, and the process returns to step S204 to repeat the processes after step S204.

As described above, the arithmetic processing device that performs arithmetic processing for controlling the on-vehicle external recognition device of the present embodiment is an arithmetic processing device connected to a plurality of sensing devices (the imaging elements 102*a*, 102*b*) mounted on the vehicle, and includes the image processing microcomputer 103 that performs arithmetic operation for controlling the plurality of sensing devices (the imaging elements 102*a*, 102*b*), and the memory 104 that stores the first arithmetic processing program (the stereo image processing setting 301) and the second arithmetic processing program (the monocular image processing redundancy setting 302).

The first arithmetic processing program (the stereo image processing setting 301) does not adopt redundancy for a failure of the sensing devices (the imaging elements 102*a*, 102*b*) and the image processing microcomputer 103. That is, in a case where either the sensing devices (the imaging elements 102*a*, 102*b*) or the image processing microcomputer 103 fails, the stereo image processing cannot be executed.

The second arithmetic processing program (the monocular image processing redundancy setting 302) adopt redundancy for a failure of the sensing devices (the imaging elements 102*a*, 102*b*) or the image processing microcomputer 103. That is, in a case where either the imaging element 102*a* or the monocular image processing unit 206*a* fails, the monocular image processing is executed by the imaging element 102*b* and the monocular image processing unit 206*b*. On the other hand, in a case where either the imaging element 102*b* or the monocular image processing unit 206*b* fails, the monocular image processing is executed by the imaging element 102*a* and the monocular image processing unit 206*a*.

In addition, the image processing microcomputer 103 includes a program switching unit (the mode instruction unit 202) which switches an arithmetic processing program to be executed on the image processing microcomputer 103 among the first arithmetic processing program (the stereo image processing setting 301) or the second arithmetic processing program (the monocular image processing redundancy setting 302) according to the travel environment information of the vehicle acquired from the map data unit 105.

The first arithmetic processing program (the stereo image processing setting 301) is an image processing configuration for stereo vision, and the second arithmetic processing program (the monocular image processing redundancy setting 302) is an image processing configuration for monocular vision.

In addition, the vehicle is automatically controlled at a predetermined automated control level using the sensing result of the sensing devices (the imaging elements 102*a*, 102*b*), and the program switching unit (the mode instruction unit 202) switches the arithmetic processing program to be executed on the image processing microcomputer 103 among the first arithmetic processing program (the stereo image processing setting 301) or the second arithmetic processing program (the monocular image processing redundancy setting 302) according to the predetermined automated control level.

According to the present invention, a microcomputer that performs image processing can perform dynamic reconfiguration of rewriting partial arithmetic logic while starting a system, and rewrites the setting of the image processing unit according to the surrounding situation. Since the image processing unit does not simultaneously execute both the stereo image processing and the monocular image processing, and always executes only one of the stereo image processing and the monocular image processing, the processing load of the microcomputer can be reduced as compared with the case of performing both the stereo image processing and the monocular image processing as in PTL 1. This leads to cost reduction of the peripheral components due to cost reduction and power consumption reduction of the microcomputer.

In addition, a fail-safe operation can be performed at the time of failure detection in non-redundant stereo image processing, and a fail operation can be performed at the time of failure detection in redundant monocular image processing.

Second Embodiment

An on-vehicle external recognition device according to a second embodiment of the present invention will be described with reference to FIGS. 6 to 10.

In the first embodiment, an example has been described in which either the stereo image processing setting 301 or the monocular image processing redundancy setting 302 is selected by the mode instruction unit 202 based on the information acquired from the map data unit 105. On the other hand, in the present embodiment, an example of selecting the driving control mode based on information of other external recognition sensors other than the stereo camera 101 acquired via the vehicle communication line will be described.

Figure 6:
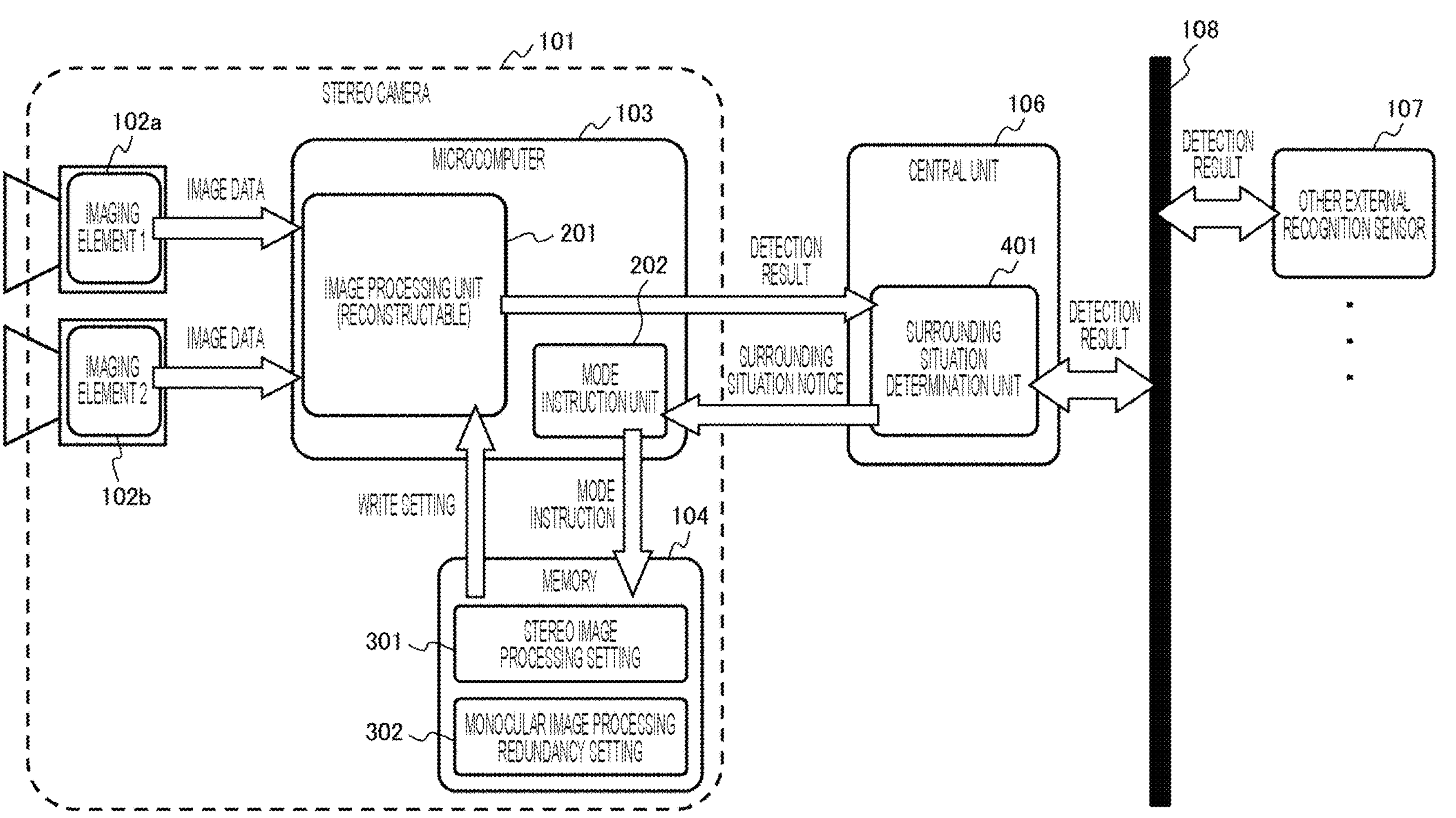
FIG. 6 is a diagram illustrating a schematic configuration of an on-vehicle external recognition device according to a second embodiment of the present invention.

FIG. 6 is a diagram illustrating a schematic configuration of an on-vehicle external recognition device of the present embodiment.

As illustrated in FIG. 6, the on-vehicle external recognition device of the present embodiment includes, as main components, a stereo camera 101, a central unit 106, and an other external recognition sensor 107 connected to the central unit 106 via a vehicle communication line 108. The other external recognition sensor 107 is an external recognition sensor other than the stereo camera 101, such as a millimeter wave radar or a sonar sensor.

Similarly to the first embodiment, the stereo camera 101, the central unit 106, and the other external recognition sensor 107 are connected by an on-vehicle network such as CAN or OTA, and can mutually transmit and receive information. The vehicle communication line 108 is a part of an on-vehicle network.

The central unit 106 includes a surrounding situation determination unit 401 that determines a surrounding situation by receiving detection results of the stereo camera 101 and the other external recognition sensor 107. The other configurations are basically similar to those of the first embodiment (FIG. 1).

In the present embodiment, it is determined whether or not the control can be safely performed only by the control by the system based on the determination of the surrounding situation determination unit 401, and it is determined whether or not the control in which all the driving operations are automated can be used.

The operation of the on-vehicle external recognition device of the present embodiment on the general road will be described with reference to FIG. 7. FIG. 7 is a diagram conceptually illustrating an operation of the on-vehicle external recognition device of FIG. 6 when it is determined that automatic driving control is impossible.

As illustrated in FIG. 7, in a case where the surrounding situation determination unit 401 determines that the automatic driving control is impossible and notifies the mode instruction unit 202 of the determination, only the partial automated control is enabled.

The switching method of the image processing unit 201 and the processing at the time of failure detection are the same as those in the case of the general road of the first embodiment (FIG. 2).

Figure 8:
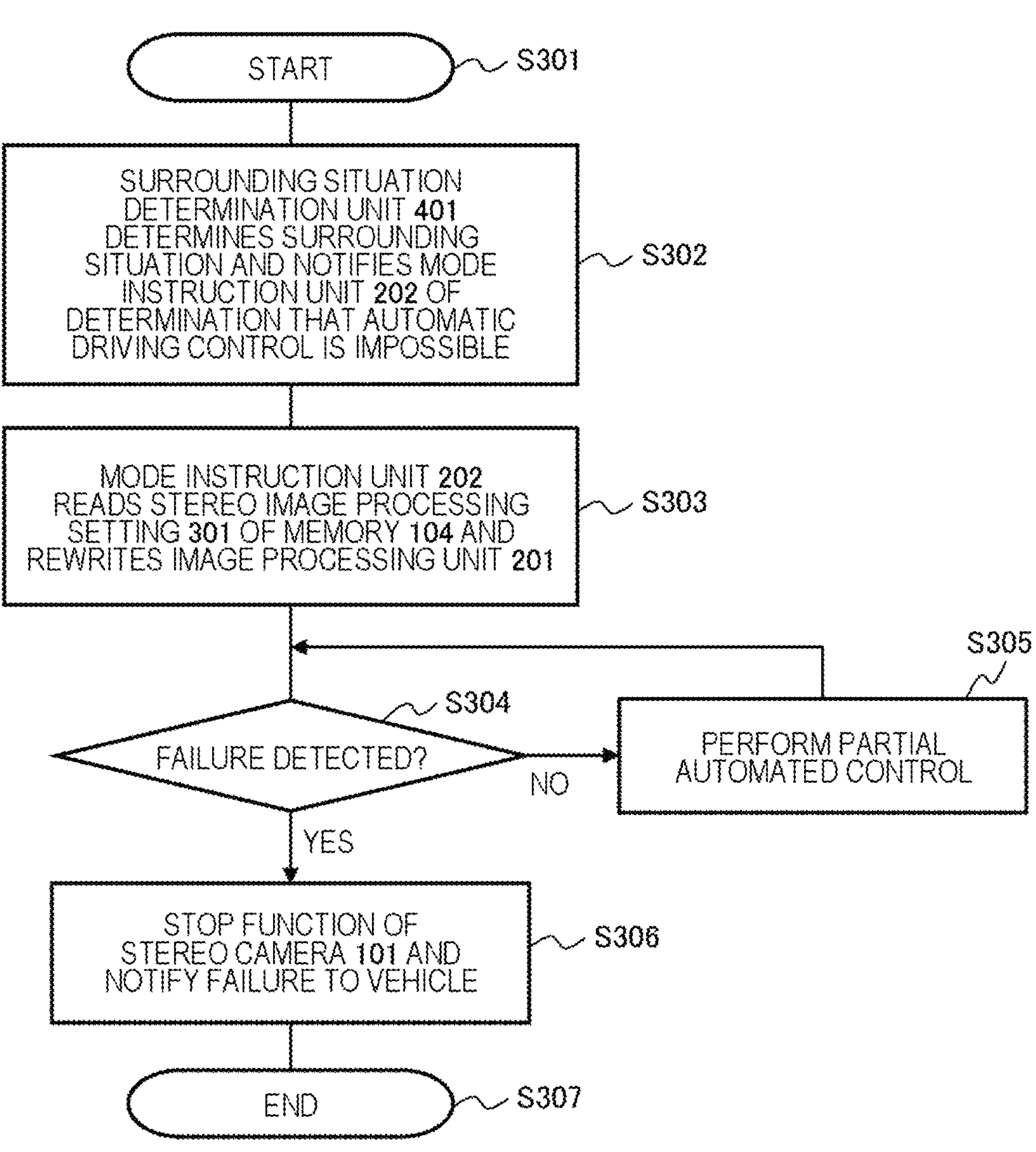
FIG. 8 is a flowchart illustrating an operation of the on-vehicle external recognition device of FIG. 6 at the time of determining that automatic driving control is impossible.

The above operation will be described with reference to FIG. 8. FIG. 8 is a flowchart illustrating an operation of the on-vehicle external recognition device of FIG. 6 when it is determined that automatic driving control is impossible.

When the operation of the on-vehicle external recognition device starts in step S301, first, in step S302, the surrounding situation determination unit 401 determines the surrounding situation and notifies the mode instruction unit 202 of the determination that the automatic driving control is impossible.

Next, in step S303, the mode instruction unit 202 reads the stereo image processing setting 301 of the memory 104 and rewrites the image processing unit 201.

Subsequently, in step S304, it is determined whether there is a failure in the imaging elements 102*a* and 102*b* and the stereo image processing unit 204.

In a case where a failure of any one of the imaging elements 102*a* and 102*b* and the stereo image processing unit 204 is detected, the process proceeds to step S306, the function of the stereo camera 101 is stopped, the failure is notified to the vehicle, and the process ends (step S307).

On the other hand, in a case where it is determined that none of the imaging elements 102*a* and 102*b* and the stereo image processing unit 204 fails, the process proceeds to step S305, partial automated control is performed, the process returns to step S304, and the processes after step S304 are repeated.

Figure 9:
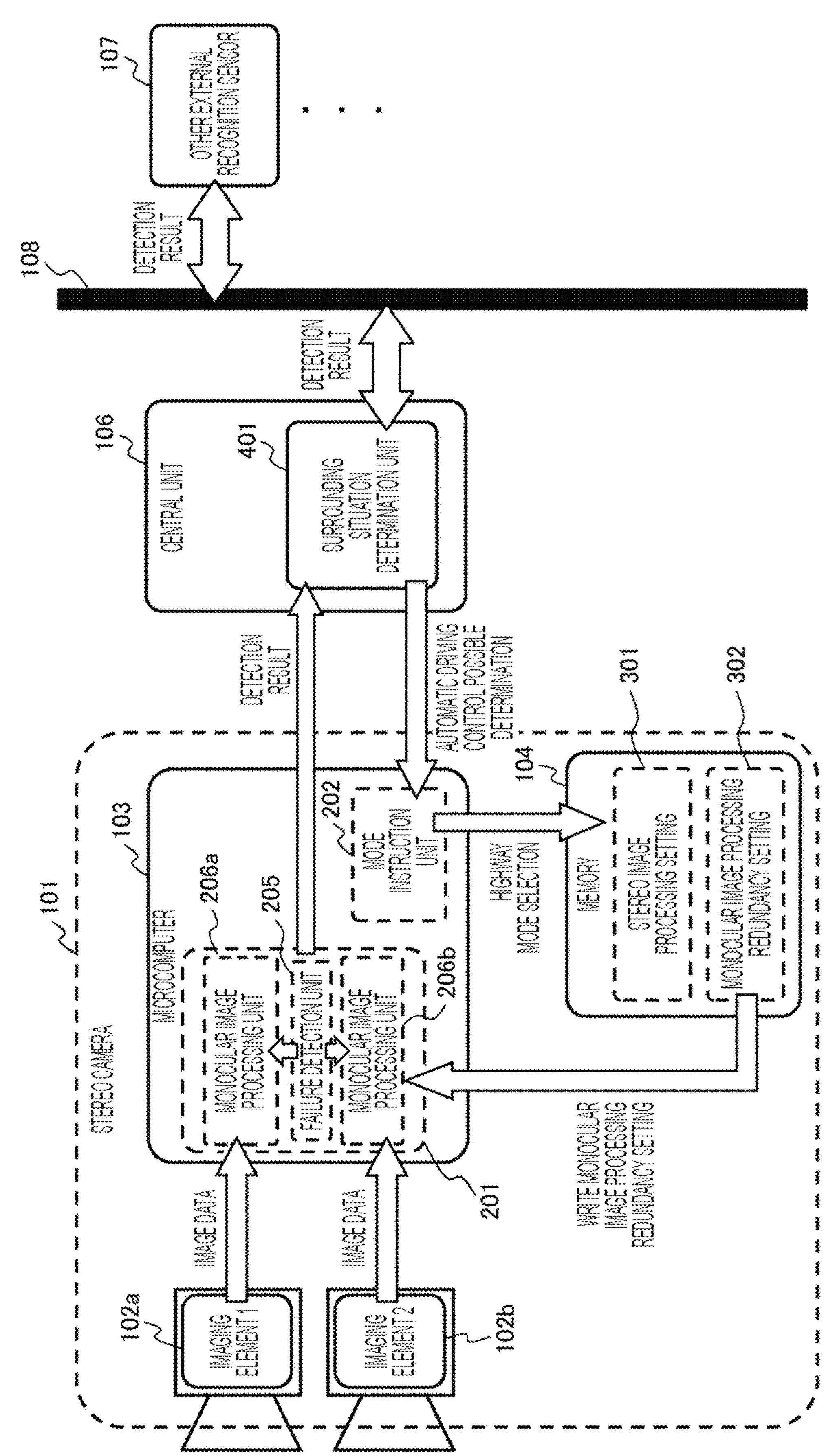
FIG. 9 is a diagram conceptually illustrating an operation of the on-vehicle external recognition device of FIG. 6 at the time of determining that automatic driving control is possible.

The operation of the on-vehicle external recognition device of the present embodiment on a highway will be described with reference to FIG. 9. FIG. 9 is a diagram conceptually illustrating an operation of the on-vehicle external recognition device of FIG. 6 at the time of automatic driving controllability determination.

As illustrated in FIG. 9, in a case where the surrounding situation determination unit 401 determines that the vehicle can safely travel only by the vehicle control by the system without performing the driving operation and monitoring the travel environment by the driver and notifies the mode instruction unit 202 of the determination, the control in which all the driving operations are automated can be used.

The switching method of the image processing unit 201 and the processing at the time of failure detection are the same as those in the case of the highway of the first embodiment (FIG. 4).

Figure 10:
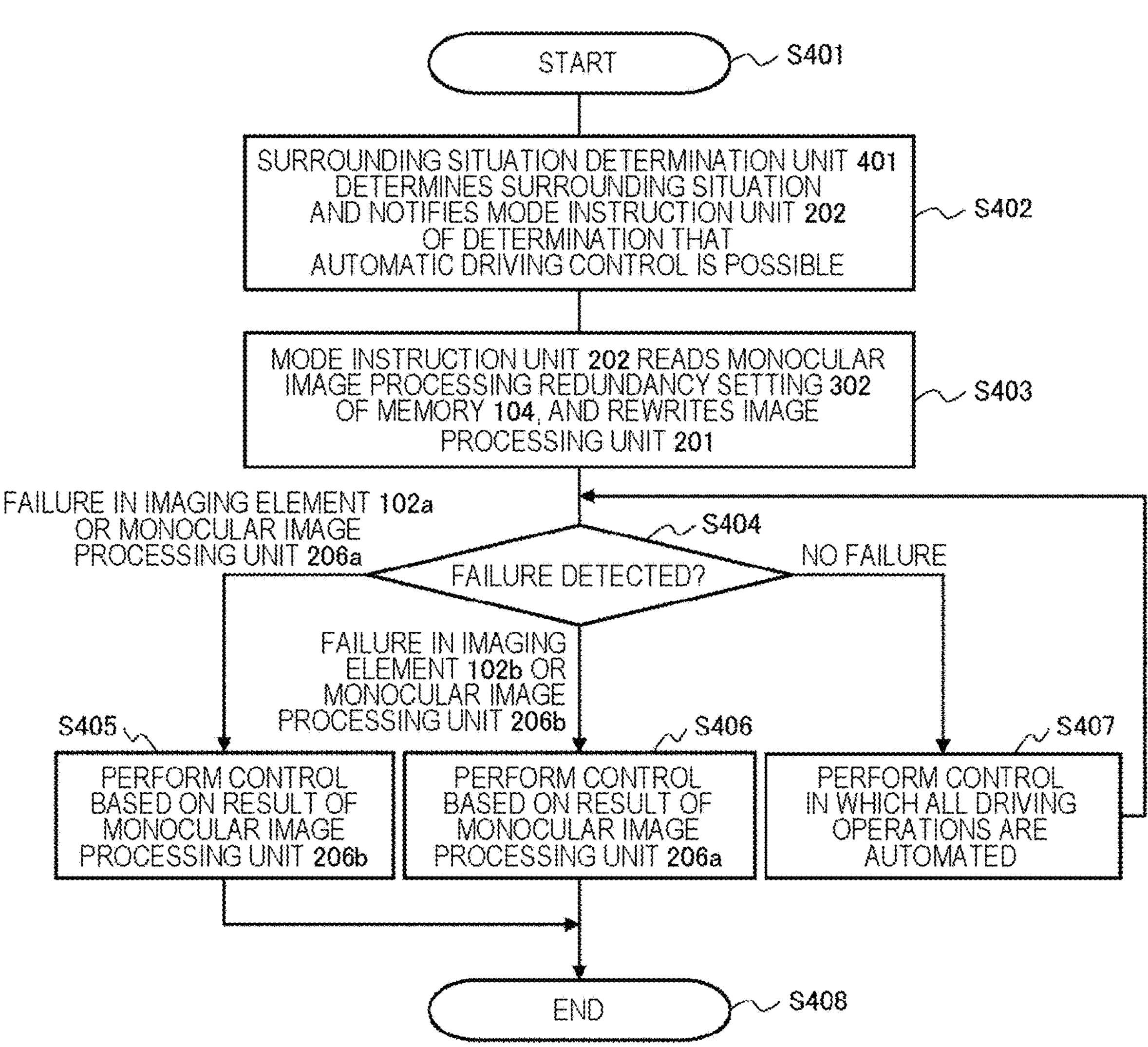
FIG. 10 is a flowchart illustrating an operation of the on-vehicle external recognition device of FIG. 6 at the time of determining that automatic driving control is possible.

The above operation will be described with reference to FIG. 10. FIG. 10 is a flowchart illustrating an operation of the on-vehicle external recognition device of FIG. 6 when it is determined that automatic driving control is possible.

When the operation of the on-vehicle external recognition device starts in step S401, first, in step S402, the surrounding situation determination unit 401 determines the surrounding situation and notifies the mode instruction unit 202 of the determination that the automatic driving control is possible.

Next, in step S403, the mode instruction unit 202 reads the monocular image processing redundancy setting 302 in the memory 104, and rewrites the image processing unit 201.

Subsequently, in step S404, it is determined whether there is a failure in the imaging elements 102*a* and 102*b* and the monocular image processing units 206*a* and 206*b*.

In a case where a failure of either the imaging element 102*a* or the monocular image processing unit 206*a* is detected, the process proceeds to step S405, control is performed based on the result of the monocular image processing unit 206*b*, and the process ends (step S408).

Furthermore, in a case where a failure of either the imaging element 102*b* or the monocular image processing unit 206*b* is detected, the process proceeds to step S406, control is performed based on the result of the monocular image processing unit 206*a*, and the process ends (step S408).

On the other hand, in a case where it is determined that none of the imaging elements 102*a* and 102*b* and the monocular image processing units 206*a* and 206*b* fails, the process proceeds to step S407 to perform control in which all driving operations are automated, and the process returns to step S404 to repeat the processes after step S404.

As described above, in the arithmetic processing device that performs the arithmetic processing for controlling the on-vehicle external recognition device of the present embodiment, the image processing microcomputer 103 switches the arithmetic processing program to be executed on the image processing microcomputer 103 among the first arithmetic processing program (the stereo image processing setting 301) or the second arithmetic processing program (the monocular image processing redundancy setting 302) according to the travel environment information and the control state information of the vehicle acquired from the other external recognition sensor 107 other than the stereo camera 101.

The central unit 106 includes the surrounding situation determination unit 401 which determines the travel environment of the vehicle, and the program switching unit (the mode instruction unit 202) switches the arithmetic processing program to be executed on the image processing microcomputer 103 among the first arithmetic processing program (the stereo image processing setting 301) and the second arithmetic processing program (the monocular image processing redundancy setting 302) based on the determination result of the surrounding situation determination unit 401.

Note that it is also possible that the surrounding situation determination unit 401 determines whether the vehicle is traveling on the general road or the highway based on the map data acquired from the map data unit 105 of the first embodiment (FIG. 1), and the program switching unit (the mode instruction unit 202) performs control to execute the first arithmetic processing program (the stereo image processing setting 301) in a case where the vehicle is traveling on the general road and execute the second arithmetic processing program (the monocular image processing redundancy setting 302) in a case where the vehicle is traveling on the highway.

That is, the surrounding situation is determined based on the sensing results by the camera, the radar, or the like and the information of the map data, and the image processing setting is switched. In a case where it is determined from the surrounding situation that the automatic driving control cannot be performed, the image processing unit is rewritten to the stereo image processing, and in a case where the automatic driving control can be performed, the setting of the monocular image processing is rewritten.

Similarly to the first embodiment, according to the present embodiment, the processing amount of the microcomputer can be reduced as compared with the case where both the stereo image processing and the monocular image processing are performed as in PTL 1.

Note that the present invention is not limited to the above-described embodiments, and includes various modifications. For example, the above-described embodiments have been described in detail in order to simply describe the present invention, and are not necessarily limited to those having all the described configurations. In addition, a part of the configuration of a certain embodiment can be replaced with the configuration of another embodiment, and the configuration of another embodiment can be added to the configuration of a certain embodiment. In addition, it is also possible to add, delete, and replace other configurations for a part of the configuration of each embodiment.

REFERENCE SIGNS LIST

101 stereo camera
102*a*, 102*b* imaging element
103 image processing microcomputer
104 memory
105 map data unit
106 central unit
107 other external recognition sensor
108 vehicle communication line
201 image processing unit
202 mode instruction unit
203 stereo image processing failure detection unit
204 stereo image processing unit
205 monocular image processing failure detection unit
206*a*, 206*b* monocular image processing unit
301 stereo image processing setting
302 monocular image processing redundancy setting
401 surrounding situation determination unit

The invention claimed is:

1. An arithmetic processing device connected to a plurality of sensing devices mounted on a vehicle, the arithmetic processing device comprising:

a microcomputer which performs an arithmetic operation to control the plurality of sensing devices; and a memory in which a first arithmetic processing program and a second arithmetic processing program are stored, wherein:

the first arithmetic processing program does not adopt redundancy for a failure of the sensing devices and the microcomputer, the second arithmetic processing program adopts redundancy for a failure of the sensing devices or the microcomputer, and the microcomputer switches an arithmetic processing program to be executed on the microcomputer among the first arithmetic processing program and the second arithmetic processing program according to a travel environment or a control state of the vehicle.

2. The arithmetic processing device according to claim 1, wherein:

the sensing devices are stereo cameras, the first arithmetic processing program is an image processing configuration for stereo vision, and the second arithmetic processing program is an image processing configuration for monocular vision.

3. The arithmetic processing device according to claim 1, wherein:

the vehicle is automatically controlled at a predetermined level using a sensing result of the sensing devices, and the microcomputer switches an arithmetic processing program to be executed on the microcomputer among the first arithmetic processing program and the second arithmetic processing program according to the predetermined level.

4. The arithmetic processing device according to claim 3, wherein;

the automated control at the predetermined level is automatic driving control by monitoring of a system regardless of monitoring and a driving operation of a driver.

5. The arithmetic processing device according to claim 1, wherein;

a surrounding situation determination unit which determines a travel environment of the vehicle is provided, and the microcomputer switches an arithmetic processing program to be executed on the microcomputer among the first arithmetic processing program and the second arithmetic processing program based on a determination result of the surrounding situation determination unit.

6. The arithmetic processing device according to claim 5, wherein:

the surrounding situation determination unit determines whether the vehicle is traveling on a general road or a highway based on map data, and the microcomputer executes the first arithmetic processing program in a case where the vehicle is traveling on the general road, and executes the second arithmetic processing program in a case where the vehicle is traveling on the highway.

7. An arithmetic processing method for controlling a plurality of sensing devices mounted on a vehicle, the arithmetic processing method comprising:

(a) determining whether the vehicle is traveling on a general road or a highway based on a travel environment or a control state of the vehicle;

(b) selecting one of a first arithmetic processing program which does not adopt redundancy for a failure of the sensing devices and a microcomputer and a second arithmetic processing program which adopts redundancy for a failure of the sensing devices or the microcomputer according to a determination result in the step (a); and (c) rewriting an arithmetic processing program to be executed on the microcomputer based on the arithmetic processing program selected in the step (b).

8. The arithmetic processing method according to claim 7, wherein:

the sensing devices are stereo cameras, the first arithmetic processing program is an image processing configuration for stereo vision, and the second arithmetic processing program is an image processing configuration for monocular vision.

9. The arithmetic processing method according to claim 7, wherein:

the vehicle is automatically controlled at a predetermined level using a sensing result of the sensing devices, and in the step (b), one of the first arithmetic processing program and the second arithmetic processing program is selected according to the predetermined level.

10. The arithmetic processing method according to claim 9, wherein:

the automated control at the predetermined level is automatic driving control by monitoring of a system regardless of monitoring and a driving operation of a driver.

* * * * *